(12) United States Patent
Shoji et al.

(10) Patent No.: US 7,736,617 B2
(45) Date of Patent: Jun. 15, 2010

(54) METHOD FOR RECOVERING IODINE

(75) Inventors: Shigenobu Shoji, Isumi (JP); Haruhisa Hujihira, Isumi (JP); Satoshi Kanbe, Mobara (JP)

(73) Assignee: Nippoh Chemicals Co., Ltd., Chuo-Ku, Tokyo (JP)

( * ) Notice: Subject to any disclaimer, the term of this patent is extended or adjusted under 35 U.S.C. 154(b) by 0 days.

(21) Appl. No.: 11/919,608

(22) PCT Filed: Apr. 28, 2006

(86) PCT No.: PCT/JP2006/309055

§ 371 (c)(1),
(2), (4) Date: Mar. 5, 2008

(87) PCT Pub. No.: WO2006/118280

PCT Pub. Date: Nov. 9, 2006

(65) Prior Publication Data

US 2009/0041655 A1 Feb. 12, 2009

(30) Foreign Application Priority Data

May 2, 2005 (JP) ............................. 2005-134651

(51) Int. Cl.
*C01B 7/14* (2006.01)
*C01B 9/06* (2006.01)
(52) U.S. Cl. .................... 423/504; 423/499.1; 423/505; 423/506
(58) Field of Classification Search ................ 423/503, 423/239.2, 700, 326, 328.1, 462–476, 497–502, 423/504, 499.1, 505, 506; 502/258
See application file for complete search history.

(56) References Cited

U.S. PATENT DOCUMENTS 2,385,483 A * 9/1945 Wolff .......................... 423/500

(Continued)

FOREIGN PATENT DOCUMENTS

EP 0 218 998 A1 4/1987

(Continued)

OTHER PUBLICATIONS

International Preliminary Report on Patentability PCT/IB373 dated Nov. 6, 2007 (including PCT/ISA/237) for PCT/JP2006/309055.

(Continued)

*Primary Examiner*—Wayne Langel
*Assistant Examiner*—Syed Iqbal
(74) *Attorney, Agent, or Firm*—Buchanan Ingersoll & Rooney PC

(57) ABSTRACT

An object of the present invention is to provide a method for recovering iodine, which can be carried out simply and economically without practicing mixing processing operation of iodine-containing material, an alkali metal compound and a solvent in advance before introducing to a combustion furnace. The object of the present invention can be attained by a method for recovering iodine which comprises feeding an iodine-containing solution containing iodine and/or iodine compound, a basic alkali metal compound solution and/or a basic alkaline earth metal compound solution separately to a roasting furnace, oxidatively decomposing a combustible material by heat treatment, and absorbing iodine and/or iodine salt contained in a component at heat treatment exit with water or an aqueous solution.

11 Claims, 4 Drawing Sheets

U.S. PATENT DOCUMENTS 3,992,510 A     11/1976   Ishigami et al.
5,520,901 A  *  5/1996   Foust ......................... 423/500

FOREIGN PATENT DOCUMENTS

| GB | 450210 A    | 7/1936  |
| GB | 1005476 A   | 9/1965  |
| GB | 1286570 A   | 8/1972  |
| JP | 51-34896    | 3/1976  |
| JP | 1-108102 A  | 4/1989  |
| JP | 01108102 A * | 4/1989 |
| JP | 6-157005 A  | 6/1994  |
| JP | 06157005 A * | 6/1994 |

OTHER PUBLICATIONS

International Search Report for PCT/IB/304 dated Aug. 1, 2006.
An Office Action issued Jun. 26, 2009 in corresponding Chinese Application No. 200680015144.8, and English translation thereof.
Supplementary Search Report issued Oct. 23, 2009 by the European Patent Office in European Application No. EP 06 74 5914.

* cited by examiner

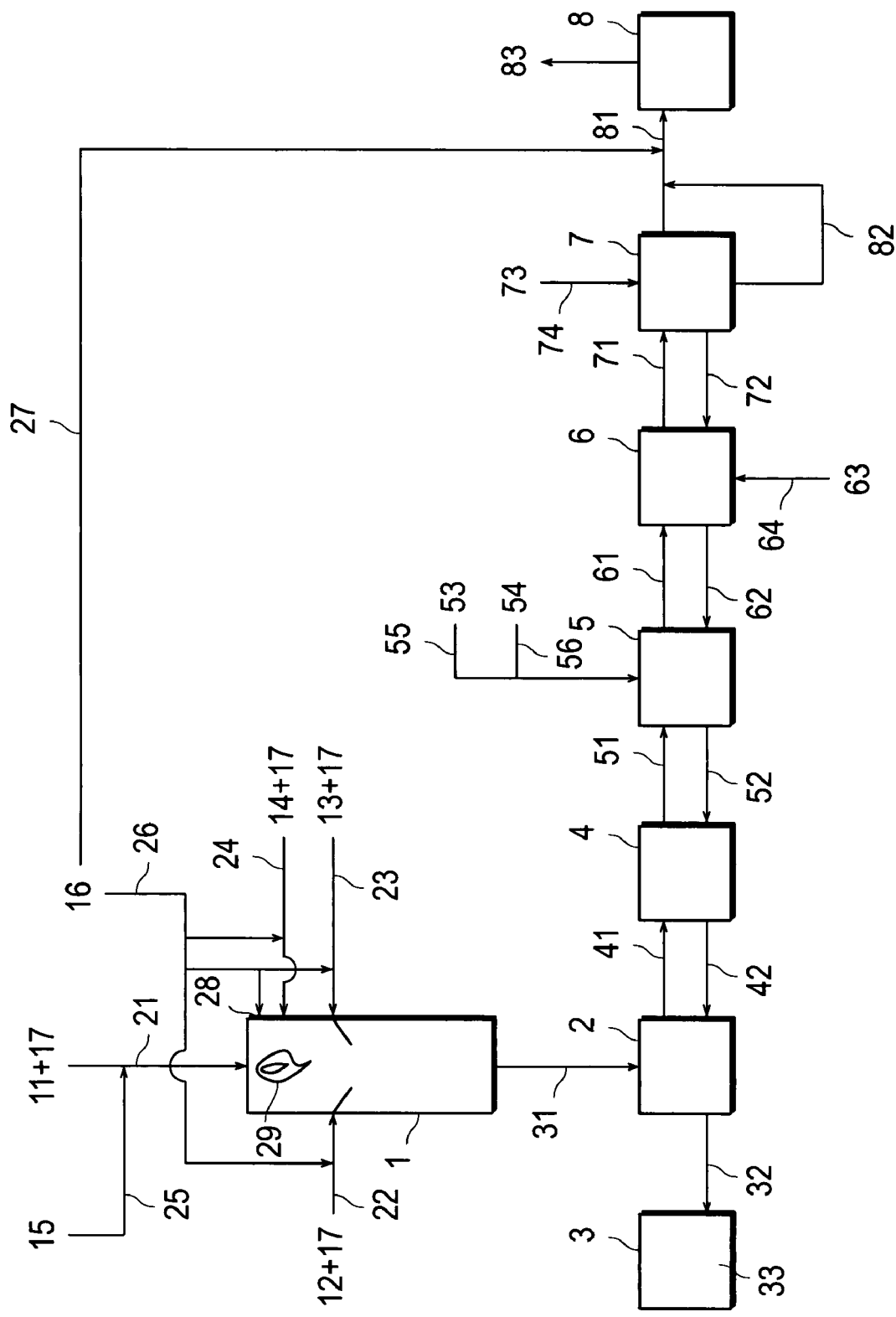

METHOD FOR RECOVERING IODINE

TECHNICAL FIELD

The present invention relates to a method for recovering iodine simply and economically by means of direct heat treatment of an iodine-containing solution containing iodine and/or an iodine compound which has been fractionally recovered into an organic iodine-containing solution, an acidic iodine-containing solution and a basic iodine-containing solution (hereinafter, simply referred to as iodine-containing solution), using one roasting furnace regardless of type of the iodine-containing solution.

BACKGROUND ART

Iodine is used for roentgen contrast agent, drug, germicide or fungicide as a raw material for daily lives, or for catalyst stabilizer, photographic material as an industrial use, and also for feed additive, herbicide, etc. as an agricultural use, and is a precious resource on a global basis. Further, in recent years, it is used, for example, in a manufacturing step of liquid crystal films, and has become an extremely important resource indispensable in the main industries in Japan. However, production of iodine is limited mainly to two countries of Japan (centered at Kanto district, producing about 40% of the world production) and Chile in South America, making iodine an extremely limited precious resource. Accordingly, recovery of expensive iodine from used iodine-containing materials containing iodine or iodine compound after utilized for specific use in each industry such as the aforementioned raw materials for daily lives, industrial chemicals, agricultural chemicals, and further, manufacturing step of the liquid crystal films, is very beneficial from the viewpoints of economy, natural environmental conservation and natural resources saving. As described above, iodine is used for raw materials, intermediates, catalysts, etc. for various products. For example, iodine is used for synthesis of an organic compound as an elemental substance or a compound, but the whole iodine used is not necessarily involved in the synthesis. Some parts may remain unreacted, or be converted to another compound. Also, when a solvent is used in a purification step to improve purity of a synthesized product, the entire product is not necessarily recovered simply, because some parts of the product may be dissolved in the solvent. Accordingly, iodine-containing materials discharged from production processes contain iodine in a form of an elemental substance or various organic or inorganic compounds, and its state also varies, for example, like waste liquid, waste oil and sludge. In the past, regarding to recovery of iodine, various proposals has been made. In particular, as an iodine recovery method associated with combustion process, for example, a method has been known, in which iodine-containing material containing iodine or iodine compound is continuously fed into a combustion furnace to generate free iodine, and the iodine gas is absorbed by a sodium thiosulfate or sodium sulfite aqueous solution. Also, an iodine recovery roasting furnace has been known, which is used for recovering iodine from iodine-containing material containing an organic compound, iodine and/or an iodine compound and an alkali metal compound. These conventional methods are very beneficial processes in terms of recovering iodine from iodine-containing material.

However, in such conventional iodine recovering method or iodine recovering roasting furnace, such problems have been pointed out that an excessive amount of chemical agent is used and that operation is complicated.

Consequently, as a method to solve these problems, a method for recovering iodine has been proposed in JP-A-1994-157005, which is characterized by comprising mixing iodine-containing material containing iodine or iodine compound with an alkali metal compound and a solvent, introducing the mixture into a combustion furnace having a combustion equipment to give heat treatment, and absorbing an iodine compound contained in the heat treatment gas with an alkaline aqueous solution.

However, in the method described in the above JP-A-1994-157005, before introducing into a combustion furnace, it was necessary that the iodine-containing material containing iodine or iodine compound was mixed with an alkali metal compound and a solvent in advance, and the resultant mixture was then introduced into a combustion furnace. Therefore, there was a problem that in the mixing step, the iodine-containing material containing iodine or iodine compound reacted with the alkali metal compound to form an insoluble precipitate, which caused clogging of piping and nozzles. If the method dared to be carried out, a step to separate solid and liquid was required. In addition, in order to remove heat of neutralization generated by the neutralization reaction between an acid contained in the iodine-containing material and the alkali metal compound as a base, an apparatus was needed. In addition, there was such a problem that in order to mix the iodine-containing material containing iodine or iodine compound with an alkali metal compound and a solvent by finely adjusting an amount of each component to be charged so that prescribed pH was obtained, a complicated and advanced mixing and stirring apparatus equipped with a flow rate regulating mechanism and a pH regulating mechanism was newly required. In addition, for performing continuous treatment, a plurality of such mixing apparatuses had to be installed, and hence had to make this system furthermore complicated and advanced one. In addition, since there was no solvent suitable for both of waste liquid and waste oil containing iodine or iodine compound, it was very difficult to homogeneously dissolve an alkali metal compound in both of waste liquid and waste oil, and this caused such a problem that when both were subjected to the heat treatment, iodine sublimed without being immobilized and reaction efficiency and consequently recovery rate was reduced. In addition, if much iodine sublimed, an absorption tower in the following step had more loading, and conventional facility could not correspond. If this problem was left unsolved, iodine was emitted to the atmosphere and environmental pollution could be caused. In order to correspond to a heavier loading, a large size of absorption tower had to be installed, but this is not economical.

DISCLOSURE OF INVENTION

An object of the present invention is to provide a method for recovering iodine simply and economically, in which iodine-containing material containing iodine or iodine compound can be fed into a roasting furnace and subjected to heat treatment, without carrying out the mixing processing operation of iodine-containing material, an alkali metal compound and a solvent in advance before introducing to a combustion furnace, and regardless of type of the iodine-containing material containing iodine or iodine compound.

In such circumstance, the present inventors intensively studied a way to solve advantageously the aforementioned problems. As a result, the present inventors have found that the above various problems can be solved by feeding an iodine-containing material containing iodine or iodine compound and an alkali metal compound/alkaline earth metal compound, each in a form of solution, for example, by feeding an iodine-containing material containing iodine or iodine compound directly as they are or after being further diluted with a suitable solvent or concentrated when they are in a state of solution such as waste liquid or waste oil, or after being dissolved in a suitable solvent when they are in a state of solid such as sludge, and also by feeding an alkali metal compound or an alkaline earth metal compound after being dissolved in a suitable solvent, each separately through a different pipeline, from a different feed opening (spraying nozzle, etc.) to a roasting furnace and subjecting them to heat treatment, thus accomplished the present invention.

For details, the object of the present invention can be attained by the methods for recovering iodine according to the following items (1) to (11).

Namely, the object of the present invention can be attained by (1) a method for recovering iodine, which comprises feeding an iodine-containing solution containing iodine and/or iodine compound, a basic alkali metal compound solution and/or a basic alkaline earth metal compound solution separately to a roasting furnace, burning a combustible material by heat treatment, and absorbing a component obtained by the heat treatment with water or an aqueous solution.

Another object of the present invention can be attained by (2) the method for recovering iodine, wherein the iodine-containing solution is at least one member selected among an organic iodine-containing solution, an acidic iodine-containing solution, and a basic iodine-containing solution.

Further another object of the present invention can be attained by (3) the method for recovering iodine according to the above item (1) or (2), wherein the basic alkali metal compound solution and/or basic alkaline earth metal compound solution is a solution comprising at least one member selected among sodium hydroxide, potassium hydroxide, sodium carbonate, potassium carbonate, calcium hydroxide and barium hydroxide.

Further another object of the present invention can be attained by (4) the method for recovering iodine according to any one of the above items (1) to (3), which comprises controlling amounts of the basic iodine-containing solution or the basic alkali metal compound solution and/or the basic alkaline earth metal compound solution as an alkaline component to be fed to the roasting furnace so that pH of the aqueous solution absorbing the component obtained by the heat treatment becomes 4 or more.

Further another object of the present invention can be attained by (5) the method for recovering iodine according to any one of the above items (1) to (4), wherein pH of the aqueous solution absorbing the component obtained by the heat treatment is 4 or more.

Further another object of the present invention can be attained by (6) the method for recovering iodine according to any one of the above items (1) to (5), wherein one member selected among heavy oil, light oil, kerosene, naphtha, natural gas, liquefied petroleum gas and methanol and a mixture thereof is fed as a combustion fuel for the roasting furnace.

Further another object of the present invention can be attained by (7) the method for recovering iodine according to any one of the above items (1) to (6), wherein both of the combustion and the iodine recovery are continuously carried out by removing some parts of the aqueous solution to outside of the system, while shortage of the aqueous solution is offset by adding fresh water instead in order to maintain specific gravity of the aqueous solution in a range from 1.0 to 1.3.

Further another object of the present invention can be attained by (8) the method for recovering iodine according to any one of the above items (1) to (7), wherein at least one iodine-containing solution and further the basic alkali metal compound solution and/or the basic alkaline earth metal compound solution, if necessary, are fed to the roasting furnace, which is maintained at a high temperature of 800° C. or higher by combusting the combustion fuel.

Further another object of the present invention can be attained by (9) the method for recovering iodine according to any one of the above items (1) to (8), wherein by the heat treatment in the roasting furnace, an iodine component is immobilized to a stable iodine salt with the alkali metal or the alkaline earth metal in the basic alkali metal compound solution and/or the basic alkaline earth metal compound solution and/or the basic iodine-containing solution.

Further another object of the present invention can be attained by (10) the method for recovering iodine according to any one of the above items (1) to (9), wherein 3 types of iodine-containing solutions including the organic iodine-containing solution, the acidic iodine-containing solution, and the basic iodine-containing solution which are fractionally recovered, the basic alkali metal compound solution and the basic alkaline earth metal compound solution are each fed in a mist (sprayed liquid droplets) state by spraying using spraying air and/or combustion air into the roasting furnace.

Further another object of the present invention can be attained by (11) the method for recovering iodine according to any one of the above items (1) to (10), wherein the iodine-containing solution is in a liquid state as it is when the iodine-containing material containing iodine or iodine compound is in a state of solution, and in a dissolved state in a solvent when the iodine-containing material containing iodine or iodine compound is in a state of solid.

Still further another object, features and characteristics of the present invention will become clear by referring to preferable embodiments exemplified in the explanation described hereinafter and accompanying drawings.

BRIEF DESCRIPTION OF DRAWINGS

FIG. 1A is a flow sheet showing an example of a process practicing the present invention.

BEST MODE FOR CARRYING OUT THE INVENTION

Figure 1B:
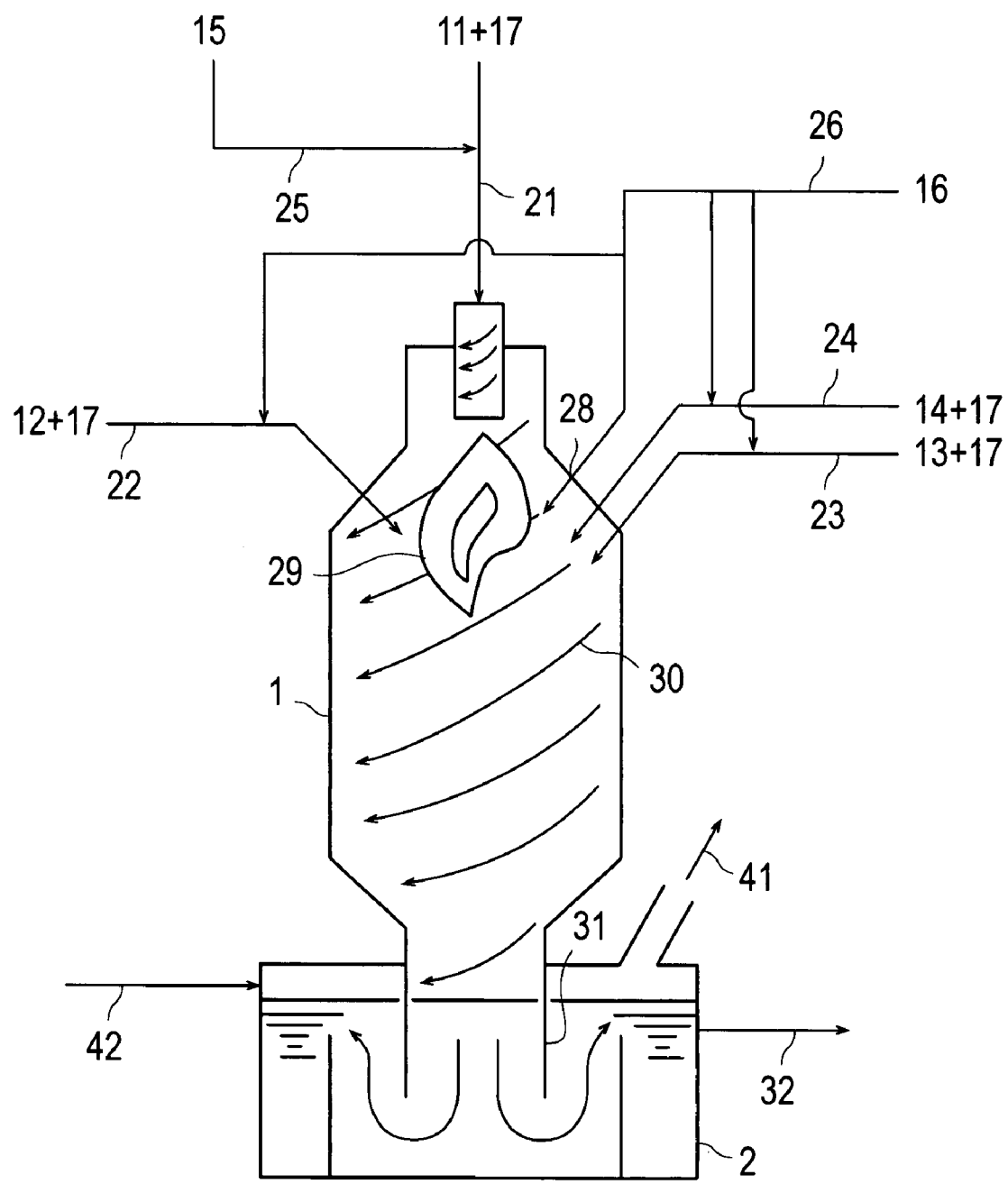
FIG. 1B is an enlarged schematic view of the roasting furnace and the cooling tank, and a schematic diagram representing schematically general picture of the swirling flow in the roasting furnace, and general picture of the absorption of a component of the heat treatment gas from the exit of roasting furnace with water or an aqueous solution in the cooling tank.

Hereinafter, embodiments of the present invention will be described in detail.

The method for recovering iodine of the present invention (the first mode) comprises feeding an iodine-containing solution, a basic alkali metal compound solution and/or a basic alkaline earth metal compound solution separately (for details, each through a different feeding route from a different feed opening such as a spraying nozzle, etc.) to a roasting furnace, subjecting the solutions to heat treatment (for details, subjecting a combustible material to oxidative decomposition to immobilize iodine component as a stable salt), and absorbing a component obtained by the heat treatment (for details, a component containing an iodine component comprising iodine and/or iodine salt) with water or an aqueous solution.

Further, the method for recovering iodine of the present invention (the second mode) comprises feeding at least one iodine-containing solution containing iodine and/or iodine compound, which is fractionated to an organic iodine-containing solution, an acidic iodine-containing solution, and a basic iodine-containing solution, separately to a roasting furnace, subjecting the solution to heat treatment, and absorbing a component obtained by the heat treatment with water or an aqueous solution.

The method for recovering iodine of the present invention (the third mode) comprises, in the above second mode, at least one of the above iodine-containing solution containing iodine and/or iodine compound, and a basic alkali metal compound solution and/or a basic alkaline earth metal compound solution are fed to a roasting furnace separately and subjected to heat treatment.

Hereinafter, the best modes for carrying out the present invention (the above first to third modes) will be explained using the drawings.

FIG. 1 is a flow sheet of a suitable embodiment of the method for recovering iodine of the present invention. An example of the steps to practice the method for recovering iodine of the present invention will be explained based on FIG. 1.

(1) Feed and Heat Treatment of Iodine-Containing Solution Step

At least one of iodine-containing solutions fractionated to an organic iodine-containing solution 11, an acidic iodine-containing solution 12, and a basic iodine-containing solution 13, and further a basic alkali metal compound solution and/or a basic alkaline earth metal compound solution (hereinafter, simply referred to as an alkali metal/alkaline earth metal compound solution, and FIG. 1 shows an example using a basic alkali metal compound solution representing them) 14 are separately (for details, each through a different feeding route for iodine-containing solution 21, 22, 23, and a feeding route for alkali metal compound solution 24 from a different feed opening (e.g. spraying nozzle, etc.)) fed to a roasting furnace 1, and subjected to heat treatment. For details, by the heat treatment, combustible materials are completely burnt and oxidatively decomposed to make the solutions harmless, and the iodine component was immobilized as a stable salt. Inside of the roasting furnace 1 is desirably maintained at a temperature of 900 to 1,000° C. in advance.

The roasting furnace may be any type as long as the furnace is capable of combusting solution, but is preferably a spray combustion type in which heat decomposition and combustion can be performed efficiently due to increased combustion surface. Further, a furnace in which combustion air 16 is fed from tuyere (blasting opening) 28 in a swirling style is more preferable. Furthermore, an under-water (submerged) combustion style in which burnt material (a component obtained by the heat treatment) is discharged into water (water or an aqueous solution in the cooling tank 2) is most preferable (see FIG. 1B). This is because extended residence time and complete heat decomposition and combustion are enabled by atomizing the solution to be charged and floating it in the swirling stream in the furnace (FIG. 1B illustrates an image of the swirling flow in the roasting furnace 30), and fly loss of generated iodine and iodides is prevented and a high recovery rate is maintained, as well as exhaust heat loss can be decreased by bringing the burnt material directly into contact with the liquid.

With regard to the iodine-containing material containing iodine and/or iodine compound (hereinafter, simply referred to as an iodine-containing material) to be used as the above iodine-containing solution, since characteristics and property of the iodine-containing material recovered are usually known for each place of origin (each user), the iodine-containing materials can be easily fractionally recovered into an organic iodine-containing materials group, an acidic iodine-containing materials group and a basic iodine-containing materials group when the iodine-containing materials are recovered. In the present invention, the iodine-containing materials fractionally recovered in such way are all converted to iodine-containing solution, for example, by using as it is when the iodine-containing material is in a state of solution such as an iodine-containing waste liquid and an iodine-containing waste oil, or by dissolving in a suitable solvent when the iodine-containing material is in a state of solid such as an iodine-containing sludge. Further, the above alkali metal compound and/or alkaline earth metal compound (hereinafter, simply referred to as an alkali metal/alkaline earth metal compound) is dissolved in a suitable solvent in a certain concentration. Concentration of an alkali metal/alkaline earth metal compound is 10 to 49% by weight, and preferably 20 to 30% by weight. In such way, the iodine-containing material and the alkali metal/alkaline earth metal compound, all in a state of solution, are fed to a roasting furnace and subjected to heat treatment, without premixing the iodine-containing solution and the basic alkali metal/alkaline earth metal compound solution before feeding to a roasting furnace, each through a different feeding route and from a different feed opening such as spraying nozzle, etc. In the present invention, therefore, it does not occur that the iodine-containing material containing iodine or iodine compound and the alkali metal compound react together resulting in formation of an insoluble precipitate before feeding them to a roasting furnace.

Since these iodine-containing material and alkali metal/alkaline earth metal compound are each in a state of solution having a known concentration, they are each desirably fed through an appropriate location of roasting furnace 1 as shown in FIG. 1, in a state of mist suitable for combustion evenly in the roasting furnace, by spraying in roasting furnace 1 through a spraying nozzle (not shown) using spraying air 17. In the present invention, since the iodine-containing material and the alkali metal/alkaline earth metal compound are each in a state of solution, the present invention is superior in the point that operation (running) can be continuously and stably performed without clogging of spraying nozzle or piping as seen in the case of a conventional slurry-like liquid containing solid. In particular, in the method for recovering iodine using such combustion process, since an amount of the iodine-containing materials, which are recovered after used for liquid crystal films, etc. is increasing year by year, continuous treatment has been strongly required from the viewpoint of economical efficiency. Consequently, reduction in recovery rate, which is caused by uneven distribution of spraying mist in the furnace or fluctuation of spraying amount due to clogging of some parts of the spraying nozzles, can be prevented. Further, the present invention is extremely advantageous because maintenance work for the spraying nozzles installed in the furnace, which is done by stopping the operation, is not needed. It should be noted, when a spraying nozzle, which can be applicable to a slurry-like liquid containing solid, is used, it is naturally necessary to use a spraying nozzle having a large spraying opening. However, use of such nozzle has been extremely uneconomical, because the nozzle reduces combustion efficiency dramatically, and requires addition of extra combustion energy. The present invention is also superior in a point that such problem does not occur at all.

Figure 1C:
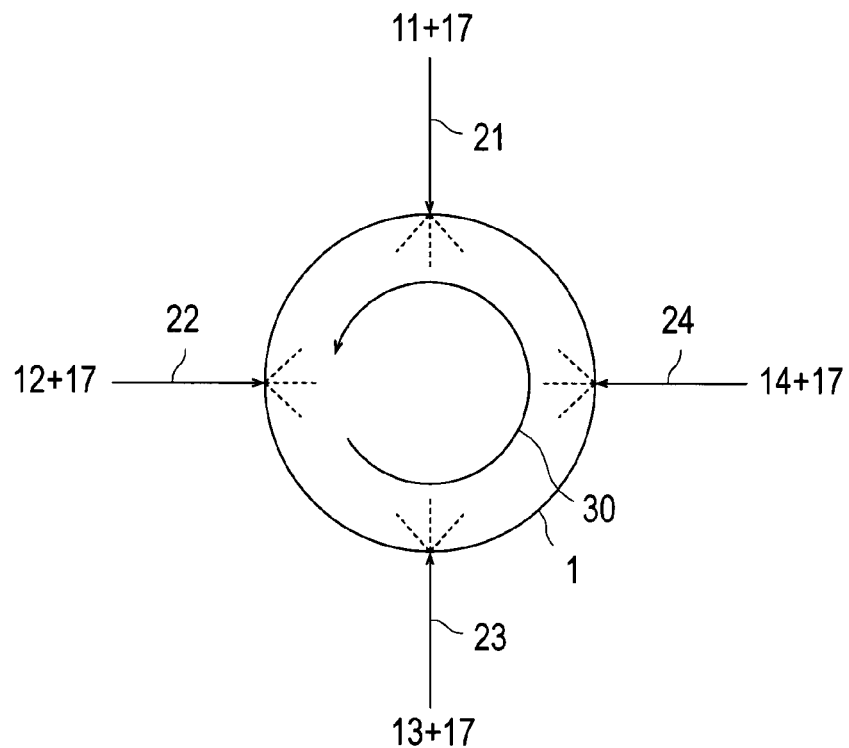
FIG. 1C is a cross-sectional schematic diagram representing an example of embodiments of feeding various types of fractionated iodine-containing solutions, a basic alkali metal compound solution and/or a basic alkaline earth metal compound solution to inside of the roasting furnace each separately.
Figure 1D:
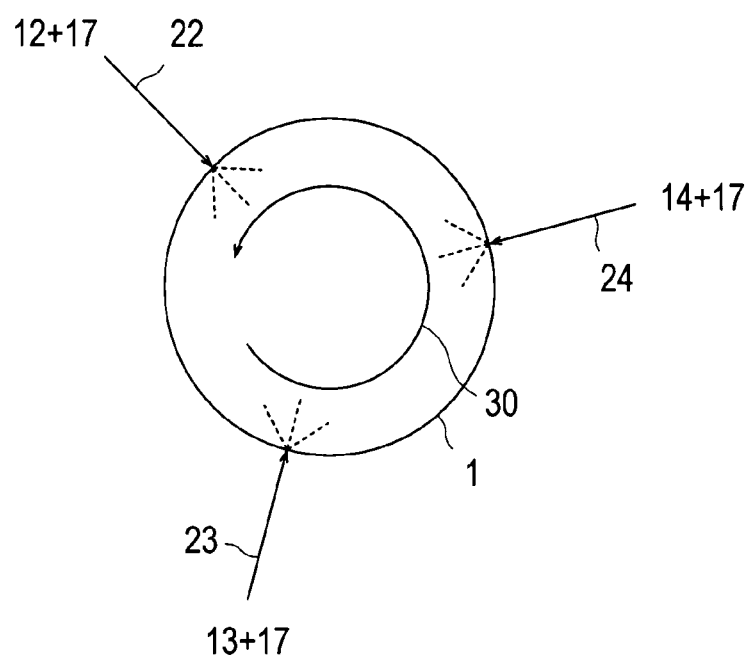
FIG. 1D is a cross-sectional schematic diagram representing another example of embodiments of feeding various types of fractionated iodine-containing solutions, a basic alkali metal compound solution and/or a basic alkaline earth metal compound solution to inside of the roasting furnace each separately.
Figure 1E:
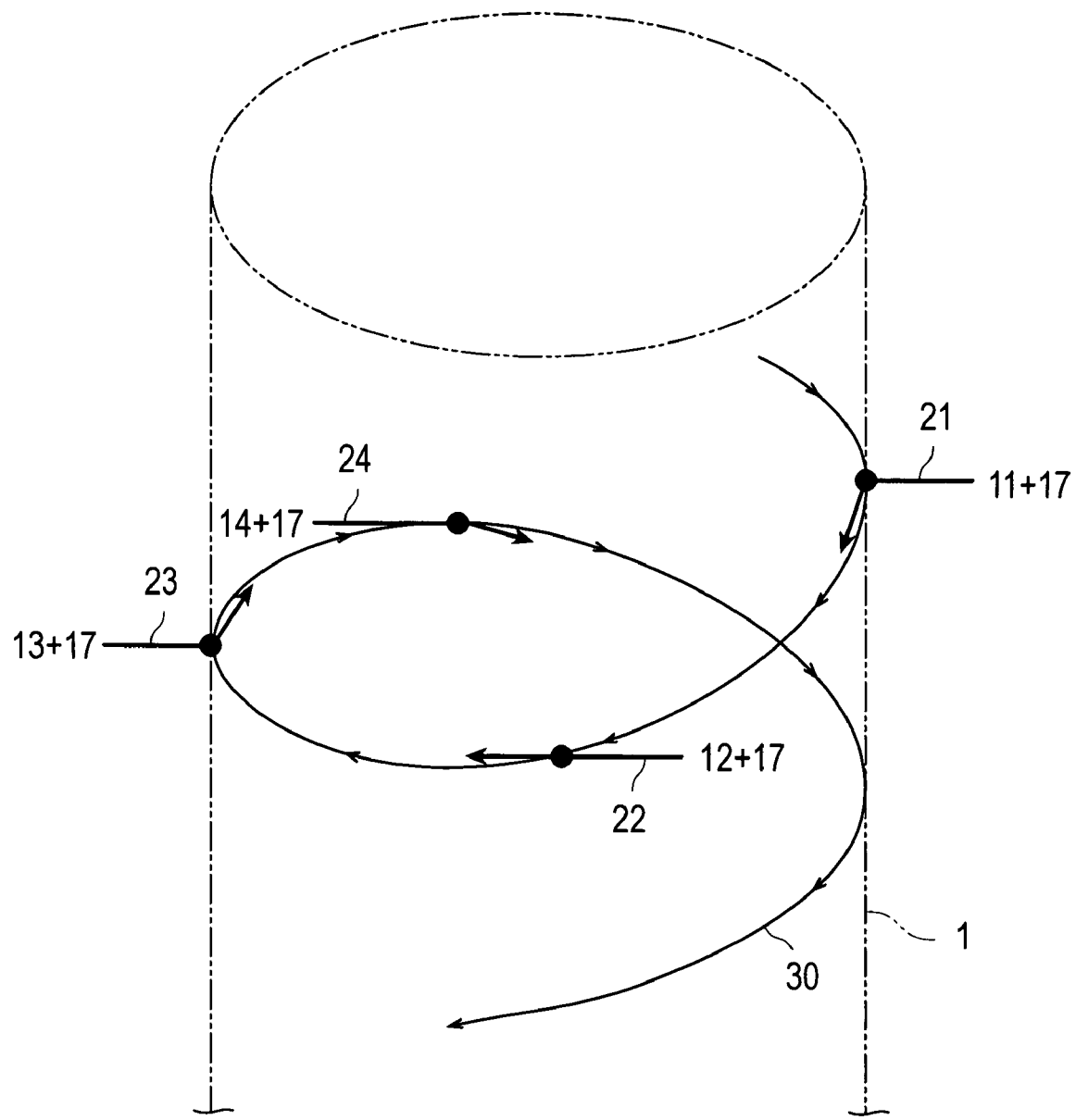
FIG. 1E is a schematic diagram representing an example of embodiments of feeding various types of fractionated iodine-containing solutions, a basic alkali metal compound solution and/or a basic alkaline earth metal compound solution to inside of the roasting furnace each separately.

Further, in the present invention, a plurality of spraying nozzles (feed openings) are arranged, and preferable embodiment is one in which sprayed mist joins swirling flow 30 efficiently to be homogenized quickly as well as a sufficient residence time in furnace can be secured by arranging each nozzle in an opposing position to each other in such a manner as surrounding burner flame 29. When three or more spraying nozzles are used, the spraying nozzles (feed openings) can be arranged, for example, as shown in FIG. 1C to FIG. 1E, in such a manner as surrounding the burner flame (not shown) along the same circumference of inner wall of furnace 1 (see FIG. 1C and FIG. 1D) or along the helical curve on a inner wall cylinder of furnace 1 (see FIG. 1E) at regular intervals so as to be along the stream of swirling flow 30 in furnace 1. Material of the spraying nozzle can be selected from those having a resistance against iodine and hydrogen iodide (hydroiodic acid). Further, as shown in FIG. 1, when iodine-containing solutions, which are classified to an organic group, an acidic group and a basic group, are sprayed into the roasting furnace each through a different feeding route from a different spraying nozzle, materials of piping of such feeding routes are desirably each selected from those having a resistance against each solution.

In the heat treatment, fuel 15 such as natural gas, etc. and combustion air 16 are each fed to roasting furnace 1 through fuel feeding route 25 and combustion air feeding route 26 (furthermore, feed piping 21 to 24 for each solution; for more detail, see FIG. 1A and FIG. 1B), and combustion is desirably performed using a main burner in roasting furnace 1 to maintain roasting furnace 1 at a high temperature of 800° C. or higher, preferably 800 to 1,200° C., and more preferably 900 to 1,000° C. Into the roasting furnace 1, at least one of the above iodine-containing solutions and further the alkali metal/alkaline earth metal compound solution are fed separately. In addition, total amount of air of spraying air 17 and combustion air 16 fed into roasting furnace 1 as oxygen sources for combustion is adjusted so that oxygen concentration in the exhaust gas from white fume prevention device 7 becomes 2 to 12% by volume, and preferably 3 to 10% by volume. In addition, the fuel for combustion in roasting furnace 1 is not particularly limited, and one member selected among heavy oil, light oil, kerosene, naphtha, natural gas, liquefied petroleum gas and methanol and a mixture thereof can be fed. Natural gas is preferable. This is because the following reason. Namely, most of iodine resources in Japan are found in the underground water layer (water-soluble natural gas deposit) containing much iodine together with natural gas, and the natural gas is produced from this underground water (brine water) together with iodine. Therefore, in iodine recovery, the natural gas can be utilized effectively.

An example of the heat treatment will be shown below. Heat treatment is performed by maintaining a high temperature in the above range, adjusting air amount so as to obtain an oxygen concentration in the above range, feeding natural gas ($CH_4$) as a fuel gas, hydroiodic acid (HI) as an acidic iodine-containing solution, aqueous sodium hydroxide solution (NaOH) as an alkali metal/alkaline earth metal compound solution, by spraying using spraying air 16, so that the chemical reactions such as the following reaction formulae (1) to (10) proceed in roasting furnace 1. Excess combustible materials not involved in these reactions are burnt with an excess amount of air and are used to maintain the temperature in the furnace. By such combustion (heat treatment), the combustible materials are oxidatively decomposed and iodine component is immobilized as a stable salt. However, the following reaction formulae are just an example and real reactions are not limited thereto.

[Chemical Formula 1]

$$CH_4 + 2H_2O \rightarrow CO_2 + 4H_2 \quad (1)$$

$$CH_4 + H_2O \rightarrow CO + 3H_2 \quad (2)$$

$$CH_4 + 1/2 O_2 \rightarrow CO + 2H_2 \quad (3)$$

$$CH_4 \rightarrow C + 2H_2 \quad (4)$$

$$CO + 1/2 O_2 \rightarrow CO_2 \quad (5)$$

$$CO + H_2O \rightarrow CO_2 + H_2 \quad (6)$$

$$C + O_2 \rightarrow CO_2 \quad (7)$$

$$H_2 + 1/2 O_2 \rightarrow H_2O \quad (8)$$

$$I_2 + H_2 \leftrightarrows 2HI \quad (9)$$

$$HI + NaOH \rightarrow NaI + H_2O \quad (10)$$

(2) Iodine Recovery Step

The component obtained by the heat treatment in the above (1) feed and heat treatment of iodine-containing solution step, in more detail, the component containing iodine and/or iodine salt generated by the heat treatment (hereinafter, also referred to as component at heat treatment exit) is absorbed with water or an aqueous solution.

For details, as shown in FIG. 1A and FIG. 1B, the component generated by the heat treatment (component at heat treatment exit) from roasting furnace 1 is blown into the liquid (water) in cooling tank 2 through heat treatment gas piping 31, to cool down gas temperature quickly to 98° C. or lower, that is, to a moisture saturation temperature, as well as to dissolve solid of iodine salts such as sodium iodide and potassium iodide in the component at heat treatment exit to recover the iodine components.

The cooling tank liquid (=purified liquid 33) dissolving iodine salts is subjected to a specific gravity control (density control), and then taken out. The purified liquid is taken out to storage tank 3 through purified liquid piping 32. In addition, in the present invention, the liquid in the cooling tank is level-controlled, and replenishment is done using circulating liquid of the dirt collector, for example, from the venturi scrubber through piping 42. Alkali metal/alkaline earth metal compound solution necessary for immobilizing iodine is fed into the roasting furnace so that pH value of the liquid in the cooling tank is controlled at 7 or above. Roasting furnace 1 can be protected by maintaining inside of roasting furnace 1 under basic atmosphere. In view of economical efficiency, use of excess alkali metal compound should be avoided, and therefore, pH of the alkali metal/alkaline earth metal compound solution is desirably controlled preferably in a range from 4 to 11, and more preferably in a range from 7 to 9.

At the same time, a fume component (NaI) in the component at heat treatment exit at 80 to 98° C. coming out from cooling tank 2 through piping 41 is collected by a dirt collector, e.g. venturi scrubber 4.

The gas containing $I_2$ coming out from the above venturi scrubber 4 is fed to an exhaust gas cleaner, e.g. packed type scrubber (absorption tower) 5 through piping 51, and also neutralizing agent 53 such as aqueous solutions of sodium hydroxide and potassium hydroxide and iodine reducing agent 54 such as bisulfite salt and/or sulfite salt and/or thiosulfate salt of alkali metal (e.g. aqueous solutions of sodium bisulfite, sodium sulfite and sodium thiosulfate) are fed to absorption tower 5 through pipings 55 and 56, respectively, to reduce and neutralize $I_2$, then sodium iodide (NaI) is absorbed. By feeding neutralizing agent 53 andiodine reducing agent 54, pH of the circulating liquid in absorption tower 5 is desirably controlled at 7 or more, and preferably in a range from 7 to 9, and oxidation and reduction potential (hereinafter, simply abbreviated as ORP value) is controlled at 400 mV or lower, and preferably in a range from −400 to 300 mV. The following reaction formulae (11) and (12) are just an example and real reactions are not limited thereto at all.

[Chemical Formula 2]

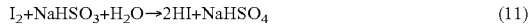

$$I_2+NaHSO_3+H_2O \rightarrow 2HI+NaHSO_4 \quad (11)$$

$$HI+NaOH \rightarrow NaI+H_2O \quad (12)$$

Minute fume, etc. (NaI, etc.) still remaining in the component at heat treatment exit coming out from the above absorption tower 5 through piping 61 is collected by a gas filter, e.g. gas filter 6. In addition, gas filter 6 receives make-up water 63 to the system through piping 64. Make-up water 63 and sodium hydroxide 14, etc. are fed so that specific gravity (density) of purified liquid 33 is in a range from 1 to 1.3, and preferably in a range from 1.05 to 1.20, and pH thereof is at 4 or more, preferably in a range from 4 to 11, and more preferably in a range from 7 to 9, and the liquid is transferred via gas filter 6, absorption tower 5, venturi scrubber 4 and cooling tank 2 through pipings 72, 62, 52, 42 and 32, respectively, to obtain purified liquid (iodine recovery liquid) 33 in storage tank 3.

Moisture content of the gas coming out from gas filter 6 is adjusted to a level not to generate white fume when the gas is released to the atmosphere from a white fume prevention device. Specifically, heat exchange of the heat treatment gas coming out from gas filter 6 through piping 71 with atmospheric air 73 is performed via heat exchanger 7, and both (i.e. the heat treatment gas coming out from heat exchanger 7 through piping 81 and atmospheric air 73 coming out from heat exchanger 7 through piping 82) are mixed together, then further diluted with combustion air 16 fed through piping 27, after that exhausted to the atmosphere from exhaust tube 8. In exhaust gas 83 exhausted to the atmosphere, free iodine gas is not present, and iodine content in the exhaust gas is, though varies depending on iodine content in the purified liquid and fly mist content, less than 1 mg/Nm³ (the symbol of Nm³ means amount of gas volume converted to the standard state of 0° C., 0.1013 MPa, and hereinafter, this symbol is used for amount of gas volume).

It should be noted that the above (2) Iodine recovery step is just shown as a specific embodiment, but the present invention should not be limited thereto at all. Namely, as to the iodine recovery step in the method for recovering iodine of the present invention, conventionally well known iodine recovery technology and dirt collection/exhaust gas cleaning technology can be utilized as appropriate.

Further, though recovery of purified iodine from purified liquid (iodine recovery liquid) 33 is not shown in FIG. 1, conventionally well known purification technology can be applied, for example, a known purification method in which, after adjusting pH, chlorine is blown into precipitate free iodine, which is then molten under pressure.

In addition, since iodine is extremely corrosive element, most of metal materials are eroded. Therefore, selection of material for iodine recovery plant is generally very difficult. The present invention is safe, because content of a corrosive iodine-containing gas in exhaust gas 83 is extremely low, and steps following roasting furnace 1 are under such conditions that reductive or oxidative corrosive action is extremely inhibited, and further the solution is neutral to weakly alkaline. Consequently, the present invention has such advantages that plant design is easy because materials such as stainless steel, polyvinyl chloride, and the like can be selected and iodine can be recovered economically and safely.

In this connection, the iodine-containing material containing iodine and/or iodine compound to be used in the present invention includes iodine, hydrogen iodide, iodine oxide, iodic acid, iodate salt, periodic acid, periodate salt, iodine halides, iodine salt, organic iodine compound, etc., and solutions thereof in aqueous solution, acidic aqueous solution, basic aqueous solution or organic solvent, etc., and further these materials containing organic matter (soluble matter). Property of each material is highly viscous liquid, solid or liquid. Those in a state of liquid by themselves is as they are, those in a state of solid is converted to iodine-containing solution by dissolving in a suitable solvent. Among the iodine-containing solution containing iodine and/or iodine compound, organic iodine-containing solution includes, for example, organic iodides such as methyl iodide, ethyl iodide, iodobenzene, iodotoluene, etc.; solutions thereof or iodine in an organic solvent such as methanol, acetone, ether, toluene, etc.; and the like. Acidic iodine-containing solution includes, for example, solutions of iodine, hydrogen iodide, sodium iodide, potassium iodide, ammonium iodide, iodine monochloride, iodic acid, etc. in water as well as in acidic aqueous solution containing an inorganic acid such as hydrochloric acid, sulfuric acid, etc., organic acid such as formic acid, acetic acid, etc., and the like. Basic iodine-containing solution includes, for example, solutions of iodine, sodium iodate, potassium iodide, sodium iodide, etc. in water, as well as in basic aqueous solution containing a base such as sodium hydroxide, potassium hydroxide, sodium carbonate, potassium carbonate, ammonia, etc. or amine such as diethyl amine, triethyl amine, etc., and the like. In addition, the acidic iodine-containing solution and the basic iodine-containing solution may contain water-soluble organic matter without any trouble as long as crystal does not deposit. The present invention has an advantage that either of waste liquids containing hydrophilic or hydrophorbic organic matter can be applied.

The basic alkali metal/alkaline earth metal compound solution to be used in the present invention is not particularly limited, and can be selected as appropriate from various solutions. In view of easiness in handling of resultant compound and economical efficiency, an aqueous solution comprising at least one member selected among sodium hydroxide, potassium hydroxide, sodium carbonate, potassium carbonate, calcium hydroxide and barium hydroxide is preferable, and sodium hydroxide aqueous solution is more preferable.

Amount of basic alkali metal/alkaline earth metal compound to be added may be, though varies depending on property of the iodine-containing solution, for example, when basic iodine-containing solution is not used as an iodine-containing solution containing iodine or iodine compound, such level that molar ratio of the alkali metal/alkaline earth metal in the alkali metal/alkaline earth metal compound solution to an amount of iodine in the iodine-containing solution is in a range of 1:0.5 to 1.5, and preferably in a range of 1:1 to 1.3. On the other hand, when basic iodine-containing solution is used as an iodine-containing solution containing iodine or iodine compound, the molar ratio of the alkali metal/alkaline earth metal in the alkali metal/alkaline earth metal compound solution may be adjusted as appropriate depending on an amount of the alkaline component in the basic iodine-containing solution. When only basic iodine-containing solution issued as an iodine-containing solution containing iodine or iodine compound, and the molar ratio of the alkaline component in the basic iodine-containing solution to an amount of iodine in the iodine-containing material is in a range of 1:0.5 to 1.5, and preferably in a range of 1:1 to 1.3, it can be said that the alkali metal/alkaline earth metal compound solution needs not to be used. In the present invention, since the alkali metal/alkaline earth metal in the alkali metal/alkaline earth metal compound solution is fed in a suitable molar ratio by controlling pH of the cooling tank liquid, the present invention is suitable to a continuous treatment.

In the present invention, though it depends on an amount of alkaline component in the iodine-containing solution containing iodine or iodine compound, the iodine-containing solution containing iodine or iodine compound and the alkali metal/alkaline earth metal compound solution can be used, for example, in the following ratio.

(1) When Alkali Metal/Alkaline Earth Metal Compound Solution is not Used

When necessary amount of alkaline component for heat treatment is contained in the iodine-containing solution, it is not necessary to use the alkali metal/alkaline earth metal compound solution, and the following cases are possible: (i) combined use of the organic iodine-containing solution and the basic iodine-containing solution, (ii) combined use of the acidic iodine-containing solution and the basic iodine-containing solution, (iii) combined use of the organic iodine-containing solution and the acidic iodine-containing solution, and (iv) single use of only the basic iodine-containing solution. When two or more of these solutions are used in combination, each solution is desirably fed to the roasting furnace separately.

(2) When Alkali Metal/Alkaline Earth Metal Compound Solution is Used

When alkaline component is not contained in the iodine-containing solution, or necessary amount of alkaline component for heat treatment is not contained, the alkali metal/alkaline earth metal compound solution is needed to make up insufficient alkaline component, and the following cases are possible: (i) combined use of the organic iodine-containing solution and the alkali metal/alkaline earth metal compound solution, (ii) combined use of the acidic iodine-containing solution and the alkali metal/alkaline earth metal compound solution, (iii) combined use of the basic iodine-containing solution and the alkali metal/alkaline earth metal compound solution, (iv) combined use of the organic iodine-containing solution, the acidic iodine-containing solution and the alkali metal/alkaline earth metal compound solution, (v) combined use of the organic iodine-containing solution, the basic iodine-containing solution and the alkali metal/alkaline earth metal compound solution, (vi) combined use of the acidic iodine-containing solution, the basic iodine-containing solution and the alkali metal/alkaline earth metal compound solution, (vii) combined use of the organic iodine-containing solution, the acidic iodine-containing solution, the basic iodine-containing solution and the alkali metal/alkaline earth metal compound solution. When two or more of these solutions are used in combination, each solution is desirably fed to the roasting furnace separately.

In addition, the solvent to be used for converting the above iodine-containing material and the alkali metal/alkaline earth metal compound to a solution is not particularly limited, as long as it can convert the iodine-containing material and the alkali metal/alkaline earth metal compound to a state of solution in order to pass through the spraying nozzle in the roasting furnace. Namely, as long as feeding routes and spraying nozzles for various iodine-containing solutions and the alkali metal/alkaline earth metal compound solution are separated from each other, any solvent can be used. Further, in the present invention, a sufficient amount of hydrogen compound is needed to convert iodine to hydrogen iodide, and water or natural gas is preferable in view of easiness in handling. Also, in the present invention, natural gas may be used not only as a fuel gas but also as one of solvent for supplying hydrogen source.

In the present invention, free iodine is hardly present in the gas exhausted from the roasting furnace, by adjusting temperature in the roasting furnace and amount of combustion air as appropriate depending on type and property of the iodine-containing solution as described above. Therefore, the present invention has an advantage that iodine and/or iodine salt, preferably potassium iodide and sodium iodide can be recovered only by cooling the component at heat treatment exit discharged from the roasting furnace to a moisture saturation temperature.

By blowing the component at heat treatment exit discharged from the roasting furnace into the above cooling tank liquid, pH of the cooling tank liquid is adjusted at 4 or more, and preferably 7 or more. When pH is in the acid range, it is indicated that iodine component has not been immobilized to sodium iodide, etc. completely, and therefore, loading of neutralization and reduction in the following absorption tower becomes very high. Also, pH in the acid range indicates that inside of the roasting furnace is under acidic atmosphere, leading to deterioration of furnace material and corrosion of metal material section in each apparatus and device (including piping). In order to prevent this, amount of the alkaline component to be fed to the roasting furnace is adjusted so that pH of the cooling tank liquid is at 7 or more, preferably in a range from 7 to 11, and more preferably in a range from 7 to 9. To adjust to alkaline side, feed amount of the basic iodine-containing solution or the alkali metal/alkaline earth metal compound solution may be adjusted as used in the above. It should be noted, pH values of the basic iodine-containing solution and the basic alkali metal compound solution and/or the basic alkaline earth metal compound solution are not particularly limited.

EXAMPLES

Next, the present invention will be explained specifically by referring to Examples.

Example 1

As an iodine-containing solution, the following solutions were used: (1) an acidic iodine-containing solution containing 20% by weight of hydrogen iodide (HI), 25% by weight of acetic acid, and 55% by weight of water, (2) a basic iodine-containing solution containing 40% by weight of hydrogen iodide (HI), 25% by weight of monomethyl amine, and 35% by weight of water, and (3) an organic iodine-containing solution containing 80% by weight of methyl iodide and 20% by weight of acetic acid, as shown in Table 1.

TABLE 1

|  | Composition of acidic iodine-containing solution (wt %) | Composition of basic iodine-containing solution (wt %) | Composition of organic iodine-containing solution (wt %) |
| --- | --- | --- | --- |
| Hydrogen iodide (HI) | 20 | 40* | — |
| Methyl iodide | — | — | 80 |
| Acetic acid | 25 | — | 20 |
| Monomethyl amine | — | 25 | — |
| Water | 55 | 35 | — |

*In Table 1, I⁻ in the basic iodine-containing solution was all converted to HI.

Subsequently, using the iodine recovery plant shown in FIG. 1, each iodine-containing solution of the above acidic iodine-containing solution 12, basic iodine-containing solution 13 and organic iodine-containing solution 11 were regulated at a flow rate of 70 [L/hr], 13 [L/hr] and 12 [L/hr], respectively, as shown in the following Table 2, and fed to roasting furnace 1 separately, more specifically, each through different feeding routes 21, 22 and 23 from different feed openings (spraying nozzles), and subjected to heat treatment.

For details, as shown in FIG. 1, combustion was performed by feeding combustion air 16, an air needed for combustion, and natural gas 15 as a fuel into the roasting furnace 1. Into the roasting furnace which was maintained at a high temperature of 900 to 1,000° C. by this combustion, organic, acidic and basic iodine-containing solutions 11, 12 and 13 were sprayed using spraying air 17 each through different feeding routes 21, 22 and 23 from different feed openings (spraying nozzles). Since alkaline component was insufficient to the iodine component fed into the furnace, sodium hydroxide aqueous solution 14 was sprayed through feeding route 24 from different feed opening (spraying nozzle) to control pH of the cooling tank liquid in a range from 7 to 9. Heat treatment was performed while such control was made. For details, by performing heat treatment while such control was made, combustible materials were oxidatively decomposed and iodine component was immobilized as a stable salt.

During the heat treatment, combustion was conducted at a natural gas amount of 33 Nm³/hr and an air amount of 550 Nm³/hr to maintain a high temperature of 900 to 1,000° C. Also, molar ratio of iodine vs alkali metal (Na) was 1:1.2.

TABLE 2

|  | Acidic iodine-containing solution | Basic iodine-containing solution | Organic iodine-containing solution | Purified liquid |
| --- | --- | --- | --- | --- |
| Flow rate [L/hr] | 70 | 13 | 12 | 472 |
| Specific gravity | 1.27 | 1.40 | 1.72 | 1.10 |
| Total-I* [wt %] | 19.8 | 39.7 | 71.5 | 7.6 |
| [kg/hr] | 17.6 | 7.2 39.6 | 14.7 | 39.5 |

*In Table 2, Total-I means total value of the iodine components such as HI, methyl iodide, NaI and $I_2$.

Iodine and iodine salts (for example, sodium iodide) contained in the component at heat treatment exit generated by the above heat treatment were absorbed with an aqueous solution according to the iodine recovery step described in FIG. 1. For details, the component at heat treatment exit generated by the heat treatment was blown into the liquid (water) in cooling tank 2 through heat treatment gas piping 31 from roasting furnace 1 to cool down quickly to the moisture saturation temperature, as well as dissolve solid of iodine salts, etc., for example, sodium iodide, in the heat treatment gas, to recover iodine components. By these procedures, flow rate of the purified liquid could be secured at a level of 472 [L/hr] as shown in Table 2.

The component at heat treatment exit coming out from the cooling tank was transferred to venturi scrubber 4, where fume of iodine salts was collected.

The component at heat treatment exit coming out from venturi scrubber 4 was transferred to absorption tower 5, where $I_2$ contained in the component at heat treatment exit was reduced and neutralized with sodium hydroxide aqueous solution 53 and sodium bisulfite aqueous solution 54, and then absorbed. Reduction, neutralization and absorption were confirmed by pH and oxidation and reduction potential (ORP value).

Subsequently, the component at heat treatment exit coming out from absorption tower 5 was transferred to gas filter 6, where fume of still remaining iodine salts was collected.

Exhaust gas after recovering iodine components was introduced to white fume prevention device 7. After heat exchange, the exhaust gas and atmospheric air were mixed together, and then released from exhaust tube 8. Some parts of the exhaust gas were condensed by cooling, and the condensed water was fed to gas filter 6.

The concentrations of salts in the component at heat treatment exit decreases correspondingly due to recovery by each main apparatus or device. Contrary, liquid is supplied from lower concentration side to higher concentration side (see arrow directions in pipings in FIG. 1). The cooling tank liquid, the liquid with the highest concentration, was taken out from storage tank 3.

In this connection, recovery rate of iodine calculated from the above iodine-containing solution fed (total amount) and iodine component in the cooling tank liquid=purified liquid 33 taken out was 99.7%. Loss of iodine component to outside corresponded to 0.1% from the result of measurement on iodine concentration in the exhaust gas. Oxygen concentration in the gas coming out from white fume prevention device 7 was 4% by volume. Also, no undecomposed iodine-containing material was detected in the cooling tank liquid=purified liquid 33 taken out.

In addition, composition (concentrations) of the purified liquid obtained is shown in Table 3 below. These values are mean values of analysis results on the purified liquid samples collected every 24 hours course when consecutive operation was carried out for 30 days.

TABLE 3

| | Concentration [g/kg] |
|---|---|
| NaI | 84.2 |
| $I_2$ | 0.8 |

Further, amounts of auxiliary materials used are shown in Table 4 below.

TABLE 4

| Material | Amount |
|---|---|
| Fuel gas (methane) | 33 $Nm^3$/hr |
| Sodium hydroxide (25%) | 50 L/hr |
| Sodium bisulfite (17%) | 6 kg/hr |
| Tap water | 12 $m^3$/day |

The fuel gas (natural gas: methane) in Table 4 was fed to roasting furnace 1 as fuel 15 by mixing with organic iodine-containing solution 11 (see FIG. 1A and FIG. 1B).

As for sodium hydroxide (sodium hydroxide aqueous solution having a concentration of 25% by weight) in Table 4, some parts (47 L/hr) was fed to roasting furnace 1 as sodium hydroxide aqueous solution 14, and the rest (3 L/hr) was fed to absorption tower 5 as sodium hydroxide aqueous solution 53 (see FIG. 1A).

As for sodium bisulfite (sodium bisulfite aqueous solution having a concentration of 17% by weight) in Table 4, the total amount was fed to absorption tower 5 as sodium bisulfite aqueous solution 54 (see FIG. 1A).

As for tap water in Table 4, the total amount was fed to gas filter 6 as water 63 (see FIG. 1A).

According to the present invention, since by feeding iodine-containing material containing iodine and/or iodine compound and further basic alkali metal compound and/or alkaline earth metal compound, each in a state of solution, to a roasting furnace separately, and burning a combustible material by heat treatment, organic matter is oxidatively decomposed to $CO_2$ and $H_2O$, nitrogen-containing organic matter is also to $CO_2$, $H_2O$, and $N_2$, further iodine component is converted to a stable salt, and a component obtained by the heat treatment (for details, a component containing iodine and/or iodine salts obtained by the heat treatment) is absorbed by water or an aqueous solution, purified iodine can be recovered economically in high yield and safely from various iodine-containing materials containing iodine and iodine compound (iodine-containing solution). In addition, since as a pretreatment step before feeding to a roasting furnace, a step in which the above iodine-containing materials, an alkali metal compound and a solvent are mixed together is not required, various problems associated with such mixing processing operation can be solved. Namely, since iodine-containing material and alkali metal compound do not react to form insoluble precipitate, such problem as clogging of piping and nozzle does not occur. Furthermore, since most of organic compounds are usually do not react rapidly with an alkali aqueous solution and hardly form a homogeneous system due to hydrophobic property, treatment thereof is practically almost impossible. However, the recovery method of the present invention does not cause such problem associated with mixing processing operation. In addition, since neutralization is carried out in a furnace, an apparatus to remove heat of neutralization is not necessary. Further, a complicated and advanced mixing and stirring equipment with a flow rate regulating mechanism, a pH regulating mechanism, etc. (including control system) required for mixing of the above iodine-containing material, an alkali metal compound and a solvent is not required. In addition, for iodine-containing waste liquid and iodine-containing waste oil containing iodine and/or iodine compound, basic alkali metal compound solution and/or basic alkaline earth metal compound solution can react evenly to both separately (for example, by spraying separately and evenly) in a roasting furnace. Therefore, iodine from various states of iodine-containing materials can be immobilized effectively, and improvement of reaction efficiency, consequently recovery rate can be attained. In addition, since iodine is immobilized as a salt in a roasting furnace, free iodine can be suppressed dramatically at low level, and therefore, loading to the exhaust gas cleaning device, for example, a packed type scrubber (absorption tower), in the following step can be controlled at the minimum level. Consequently, even existing facility can correspond sufficiently. When a nitrogen compound is present as a component of the iodine-containing solution, generation of a large amount of NO is found if the iodine-containing solution is subjected to only heat treatment at a high temperature. Namely, nitrogen compound is converted more easily to NO as combustion temperature becomes higher, contrary, generation of NO is more suppressed as combustion temperature becomes lower, but combustion temperature must be a degradable temperature for organic matter or more. Combustion temperature at around 800 to 1,200° C. is a temperature at which NO generation can be suppressed and conversion to $N_2$ occurs easily. Consequently, the present invention can prevent environmental pollution problem without fail.

In addition, the present application is based on JP Application No. 2005-134651 filed on May 2, 2005, and content of the disclosure is incorporated herein in its entirety by reference.

What is claimed is:

1. A method for recovering iodine, which comprises:
   feeding (a) an iodine-containing solution containing iodine, an iodine compound, or a mixture thereof, and (b) at least one solution selected from the group consisting of a basic alkali metal compound solution and a basic alkaline earth metal compound solution separately to a roasting furnace, without premixing (a) and (b), through a different pipeline and from a different feed opening;
   burning a combustible material so as to provide a heat treatment in said roasting furnace; and
   absorbing a component obtained by said heat treatment with water or an aqueous solution.

2. The method for recovering iodine according to claim 1, wherein said iodine-containing solution is at least one member selected from the group consisting of an organic iodine-containing solution, an acidic iodine-containing solution, and a basic iodine-containing solution.

3. The method for recovering iodine according to claim 1, wherein said (b) at least one solution selected from the group consisting of the basic alkali metal compound solution and the basic alkaline earth metal compound solution is a solution comprising at least one member selected from the group consisting of sodium hydroxide, potassium hydroxide, sodium carbonate, potassium carbonate, calcium hydroxide and barium hydroxide.

4. The method for recovering iodine according to claim 1, which comprises controlling amounts of the basic iodine-containing solution or (b) at least one solution selected from the group consisting of the basic alkali metal compound solution and the basic alkaline earth metal compound solution as an alkaline component to be fed to the roasting furnace so that pH of the aqueous solution absorbing the component obtained by the heat treatment becomes 4 or more.

5. The method for recovering iodine according to claim 1, wherein pH of the aqueous solution absorbing the component obtained by the heat treatment is 4 or more.

6. The method for recovering iodine according to claim 1, wherein one member selected from the group consisting of heavy oil, light oil, kerosene, naphtha, natural gas, liquefied petroleum gas, methanol and a mixture thereof is fed as a combustion fuel for the roasting furnace.

7. The method for recovering iodine according to claim 1, wherein both of the combustion and the iodine recovery are continuously carried out by removing some parts of said aqueous solution to outside of the system, while shortage of said aqueous solution is offset by adding fresh water instead in order to maintain specific gravity of the aqueous solution in a range from 1.0 to 1.3.

8. The method for recovering iodine according to claim 1, wherein at least one iodine-containing solution and further (b) at least one solution selected from the group consisting of the basic alkali metal compound solution and the basic alkaline earth metal compound solution, if necessary, are fed to the roasting furnace, which is maintained at a temperature of 800° C. or higher by combusting the combustion fuel.

9. The method for recovering iodine according to claim 1, wherein by the heat treatment in the roasting furnace, an iodine component is immobilized to a stable iodine salt with the alkali metal or the alkaline earth metal in at least one solution selected from the group consisting of the basic alkali metal compound solution, the basic alkaline earth metal compound solution and the basic iodine-containing solution.

10. The method for recovering iodine according to claim 1, wherein (1) a fractionally recovered organic iodine-containing solution, (2) a fractionally recovered acidic iodine-containing solution, (3) a fractionally recovered basic iodine-containing solution, and (4) at least one solution selected from the group consisting of the basic alkali metal compound solution and the basic alkaline earth metal compound solution are each fed in a mist state by spraying using spraying air, combustion air, or a mixture thereof into the roasting furnace.

11. The method for recovering iodine according to claim 1, wherein said iodine-containing solution is in a liquid state as it is when the iodine-containing material containing iodine or iodine compound is in a state of solution, and in a dissolved state in a solvent when the iodine-containing material containing iodine or iodine compound is in a state of solid.

\* \* \* \* \*